United States Patent
Brasz et al.

(10) Patent No.: US 6,892,522 B2
(45) Date of Patent: May 17, 2005

(54) COMBINED RANKINE AND VAPOR COMPRESSION CYCLES

(75) Inventors: Joost J. Brasz, Fayetteville, NY (US); Bruce P. Biederman, West Hartford, CT (US)

(73) Assignee: Carrier Corporation, Farmington, CT (US)

( * ) Notice: Subject to any disclaimer, the term of this patent is extended or adjusted under 35 U.S.C. 154(b) by 131 days.

(21) Appl. No.: 10/293,712

(22) Filed: Nov. 13, 2002

(65) Prior Publication Data

US 2004/0088992 A1 May 13, 2004

(51) Int. Cl.⁷ ............................. F02C 6/18; F02C 7/143
(52) U.S. Cl. ..................................... 60/39.181; 60/728
(58) Field of Search ........................ 60/39.181–39.182, 60/728–801, 802

(56) References Cited

U.S. PATENT DOCUMENTS

| | | | |
|---|---|---|---|
| 3,393,515 A | | 7/1968 | Tabor et al. |
| 3,796,045 A | * | 3/1974 | Foster-Pegg ............. 60/39.182 |
| 4,386,499 A | | 6/1983 | Raviv et al. |
| 4,458,493 A | | 7/1984 | Amir et al. |
| 4,590,384 A | | 5/1986 | Bronicki |
| 4,617,808 A | | 10/1986 | Edwards |
| 4,760,705 A | | 8/1988 | Yogev et al. |
| 4,901,531 A | | 2/1990 | Kubo et al. |
| 5,038,567 A | | 8/1991 | Mortiz |
| 5,119,635 A | | 6/1992 | Harel |
| 5,145,317 A | | 9/1992 | Brasz |
| 5,252,027 A | | 10/1993 | Brasz |

(Continued)

FOREIGN PATENT DOCUMENTS

| | | |
|---|---|---|
| DE | 19630559 | 1/1998 |
| DE | 19907512 | 8/2000 |
| DE | 10029732 | 1/2002 |
| EP | 0 050 959 B1 | 5/1982 |
| EP | 0 050 959 A1 | 5/1982 |
| EP | 0 121 392 | 10/1984 |
| EP | 1243758 | 9/2002 |
| JP | 52046244 | 4/1977 |
| JP | 54045419 | 4/1979 |
| JP | 54060634 | 5/1979 |
| JP | 55091711 | 7/1980 |
| JP | 58088409 | 5/1983 |

(Continued)

OTHER PUBLICATIONS

Thermodynamics of Waste Heat Recovery in Motor Ships, Professor A.J. Morton, MSc, Manchester University, Mechanical Engineering Dept., Trans I Mar E (C), 1981, vol 93, Paper C69, pp. 1–7.

Honeywell, HFC–245fa, . . . An Ideal Zero–ODP Blowing Agent.

Gary J. Zyhowski, Sr., Mark W. Spatz and Samuel Motta, An Overview of the Properties and Applications of HFC–245fa.

*Primary Examiner*—Louis J. Casaregola
(74) *Attorney, Agent, or Firm*—Wall Marjama & Bilinski LLP

(57) ABSTRACT

An organic rankine cycle system is combined with a vapor compression cycle system with the turbine generator of the organic rankine cycle generating the power necessary to operate the motor of the refrigerant compressor. The vapor compression cycle is applied with its evaporator cooling the inlet air into a gas turbine, and the organic rankine cycle is applied to receive heat from a gas turbine exhaust to heat its boiler within one embodiment, a common condenser is used for the organic rankine cycle and the vapor compression cycle, with a common refrigerant, R-245a being circulated within both systems. In another embodiment, the turbine driven generator has a common shaft connected to the compressor to thereby eliminate the need for a separate motor to drive the compressor.

5 Claims, 8 Drawing Sheets

U.S. PATENT DOCUMENTS

| | | | |
|---|---|---|---|
| 5,266,002 A | 11/1993 | Brasz | |
| 5,339,632 A | 8/1994 | McCrabb et al. | |
| 5,445,496 A | 8/1995 | Brasz | |
| 5,598,706 A | 2/1997 | Bronicki et al. | |
| 5,632,143 A | 5/1997 | Fisher et al. | |
| 5,640,842 A | 6/1997 | Bronicki | |
| 5,664,419 A | 9/1997 | Kaplan | |
| 5,761,921 A | 6/1998 | Hori et al. | |
| 5,807,071 A | 9/1998 | Brasz et al. | |
| 5,809,782 A | 9/1998 | Bronicki et al. | |
| 5,860,279 A | 1/1999 | Bronicki et al. | |
| 5,895,793 A | 4/1999 | Kitamura et al. | |
| 6,009,711 A | 1/2000 | Kreiger et al. | |
| 6,041,604 A | 3/2000 | Nicodemus | |
| 6,050,083 A | 4/2000 | Meckler | |
| 6,101,813 A | 8/2000 | Sami et al. | |
| 6,233,938 B1 | 5/2001 | Nicodemus | |
| 6,497,090 B2 | 12/2002 | Bronicki et al. | |
| 6,539,718 B2 | 4/2003 | Bronicki et al. | |
| 6,539,720 B2 | 4/2003 | Rouse et al. | |
| 6,539,723 B2 | 4/2003 | Bronicki et al. | |
| 6,571,548 B1 | 6/2003 | Bronicki et al. | |
| 2001/0027642 A1 * | 10/2001 | Tsuji | 60/39.182 |
| 2002/0050134 A1 * | 5/2002 | Bronicki et al. | 60/39.182 |
| 2002/0148225 A1 | 10/2002 | Lewis | |
| 2003/0029169 A1 | 2/2003 | Hanna et al. | |
| 2003/0089110 A1 | 5/2003 | Niikura et al. | |
| 2003/0167769 A1 | 9/2003 | Bharathan et al. | |

FOREIGN PATENT DOCUMENTS

| | | |
|---|---|---|
| JP | 5812308 | 7/1983 |
| JP | 59043928 | 3/1984 |
| JP | 59054712 | 3/1984 |
| JP | 59063310 | 4/1984 |
| JP | 59158303 | 9/1984 |
| JP | 60158561 | 8/1985 |
| JP | 06088523 | 3/1994 |
| JP | 59138707 | 8/1994 |
| JP | 2002266655 | 9/2002 |
| JP | 2002285805 | 10/2002 |
| JP | 2002285907 | 10/2002 |
| JP | 2003161101 | 6/2003 |
| JP | 2003161114 | 6/2003 |
| WO | 96/39577 | 12/1996 |
| WO | 98/06791 | 2/1998 |
| WO | 02/099279 | 12/2002 |
| WO | 03/078800 | 9/2003 |

* cited by examiner

COMBINED RANKINE AND VAPOR COMPRESSION CYCLES

BACKGROUND OF THE INVENTION

This invention relates generally to organic rankine cycle systems and, more particularly, to an economical and practical method and apparatus therefor.

The well known closed rankine cycle comprises a boiler or evaporator for the evaporation of a motive fluid, a turbine fed with vapor from the boiler to drive the generator or other load, a condenser for condensing the exhaust vapors from the turbine and a means, such as a pump, for recycling the condensed fluid to the boiler. Such a system as is shown and described in U.S. Pat. No. 3,393,515.

Such rankine cycle systems are commonly used for the purpose of generating electrical power that is provided to a power distribution system, or grid, for residential and commercial use across the country. The motive fluid used in such systems is often water, with the turbine then being driven by steam. The source of heat to the boiler can be of any form of fossil fuel, e.g. oil, coal, natural gas or nuclear power. The turbines in such systems are designed to operate at relatively high pressures and high temperatures and are relatively expensive in their manufacture and use.

With the advent of the energy crisis and, the need to conserve, and to more effectively use, our available energies, rankine cycle systems have been used to capture the so called "waste heat", that was otherwise being lost to the atmosphere and, as such, was indirectly detrimental to the environment by requiring more fuel for power production than necessary.

One common source of waste heat can be found at landfills where methane gas is flared off to thereby contribute to global warming. In order to prevent the methane gas from entering the environment and thus contributing to global warming, one approach has been to burn the gas by way of so called "flares". While the combustion products of methane ($CO_2$ and $H_2O$) do less harm to the environment, it is a great waste of energy that might otherwise be used.

Another approach has been to effectively use the methane gas by burning it in diesel engines or in relatively small gas turbines or microturbines, which in turn drive generators, with electrical power then being applied directly to power-using equipment or returned to the grid. With the use of either diesel engines or microturbines, it is necessary to first clean the methane gas by filtering or the like, and with diesel engines, there is necessarily significant maintenance involved. Further, with either of these approaches there is still a great deal of energy that is passed to the atmosphere by way of the exhaust gases.

Other possible sources of waste heat that are presently being discharged to the environment are geothermal sources and heat from other types of engines such as gas turbine engines that give off significant heat in their exhaust gases and reciprocating engines that give off heat both in their exhaust gases and to cooling liquids such as water and lubricants.

In the operation of gas turbine engines, it has become a common practice to use an air conditioning system to cool the inlet air passing to the gas turbine in order to improve efficiency thereof during the warmer ambient conditions. It is also known to use the heat from the exhaust gases of a gas turbine engine in order to heat water for hot water heating. However, the demand for hot water heating during hot ambient conditions is limited while the demand for electric power often increases under those conditions.

It is therefore an object of the present invention to provide a new and improved closed rankine cycle power plant that can more effectively use waste heat.

Another object of the present invention is the provision for a rankine cycle turbine that is economical and effective in manufacture and use.

Another object of the present invention is the provision for more effectively using the secondary sources of waste heat.

Yet another object of the present invention is the provision for a rankine cycle system which can operate at relatively low temperatures and pressures.

A further object of the present invention is the provision for more effectively generating and using the energy of a gas turbine engine.

Still another object of the present invention is the provision for a rankine cycle system which is economical and practical in use.

These objects and other features and advantages become more readily apparent upon reference to the following descriptions when taken in conjunction with the appended drawings.

SUMMARY OF THE INVENTION

Briefly, in accordance with one aspect of the invention, a centrifugal compressor which is designed for compression of refrigerant for purposes of air conditioning, is used in a reverse flow relationship so as to thereby operate as a turbine in a closed organic rankine cycle (ORC) system. In this way, an existing hardware system which is relatively inexpensive, is used to effectively meet the requirements of an organic rankine cycle turbine for the effective use of waste heat.

By another aspect of the invention, a centrifugal compressor having a vaned diffuser is effectively used as a power generating turbine with flow directing nozzles when used in a reverse flow arrangement.

By yet another aspect of the invention, a centrifugal compressor with a pipe diffuser is used as a turbine when operated in a reverse flow relationship, with the individual pipe openings being used as nozzles.

In accordance with another aspect of the invention, a compressor/turbine uses an organic refrigerant as a motive fluid with the refrigerant being chosen such that its operating pressure is within the operating range of the compressor/turbine when operating as a compressor.

In accordance with another aspect of the invention, available waste heat from a gas turbine exhaust is used to drive an organic rankine cycle turbine to thereby produce power which is used, in part, to drive a vapor compression cycle machine such as a centrifugal chiller to cool down the inlet temperature of the gas turbine and thereby increase its efficiency and capacity.

By yet another object of the present invention, both the rankine cycle system and the vapor compression cycle system use a common condenser.

By still another object of the present invention, a common shaft is used for the turbine generator of the rankine cycle system and the compressor of the vapor compression cycle system, thereby eliminating the need for a compressor motor, reducing the size of the generator and eliminating the need for a separate compressor assembly.

In the drawings as hereinafter described, a preferred embodiment is depicted; however various other modifica-

DESCRIPTION OF THE PREFERRED EMBODIMENT

Figure 1:
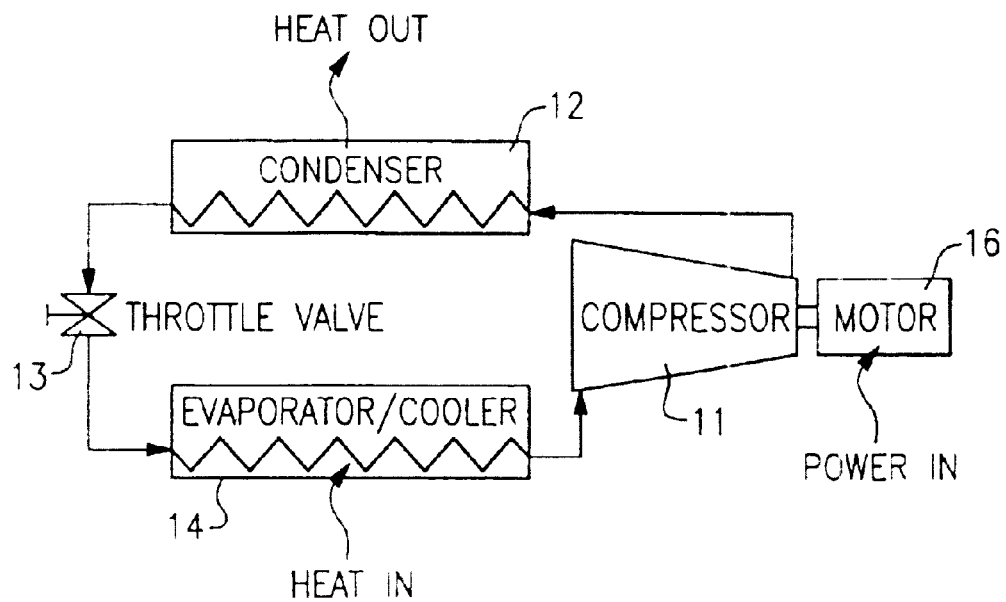
FIG. 1 is a schematic illustration of a vapor compression cycle in accordance with the prior art.

Referring now to FIG. 1, a typical vapor compression cycle is shown as comprising, in serial flow relationship, a compressor 11, a condenser 12, a throttle valve 13, and an evaporator/cooler 14. Within this cycle a refrigerant, such as R-11, R-22, or R-134a is caused to flow through the system in a counterclockwise direction as indicated by the arrows.

The compressor 11 which is driven by a motor 16 receives refrigerant vapor from the evaporator/cooler 14 and compresses it to a higher temperature and pressure, with the relatively hot vapor then passing to the condenser 12 where it is cooled and condensed to a liquid state by a heat exchange relationship with a cooling medium such as air or water. The liquid refrigerant then passes from the condenser to a throttle valve wherein the refrigerant is expanded to a low temperature two-phase liquid/vapor state as it passes to the evaporator/cooler 14. The evaporator liquid provides a cooling effect to air or water passing through the evaporator/cooler. The low pressure vapor then passes to the compressor 11 where the cycle is again commenced.

Depending on the size of the air conditioning system, the compressor may be a rotary, screw or reciprocating compressor for small systems, or a screw compressor or centrifugal compressor for larger systems. A typical centrifugal compressor includes an impeller for accelerating refrigerant vapor to a high velocity, a diffuser for decelerating the refrigerant to a low velocity while converting kinetic energy to pressure energy, and a discharge plenum in the form of a volute or collector to collect the discharge vapor for subsequent flow to a condenser. The drive motor 16 is typically an electric motor which is hermetically sealed in the other end of the compressor 11 and which, through a transmission 26, operates to rotate a high speed shaft.

Figure 2:
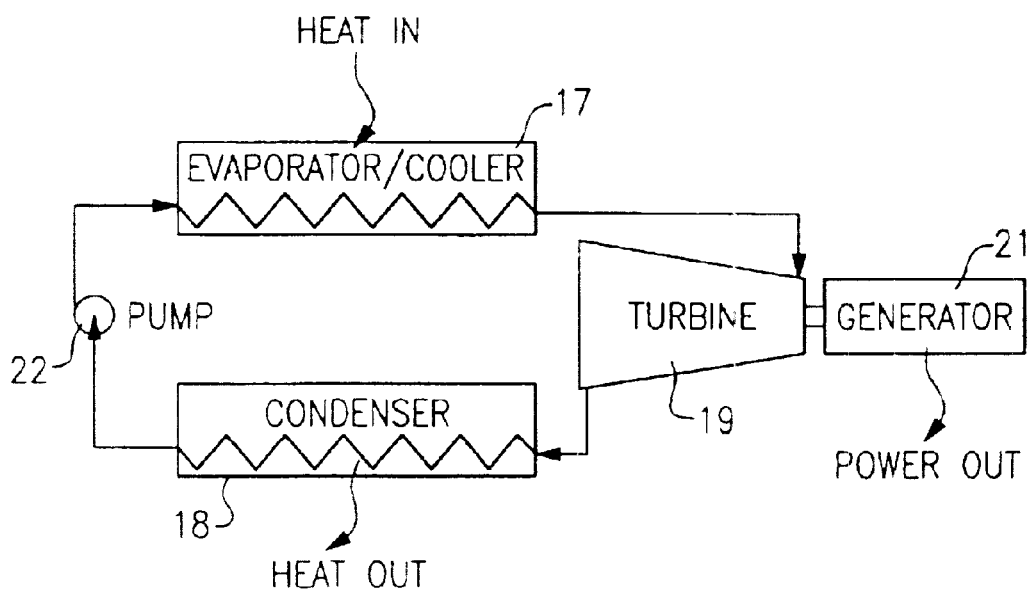
FIG. 2 is a schematic illustration of a rankine cycle system in accordance with the prior art.

A typical rankine cycle system as shown in FIG. 2 also includes an evaporator/cooler 17 and a condenser 18 which, respectively, receives and dispenses heat in the same manner as in the vapor compression cycle as described hereinabove. However, as will be seen, the direction of fluid flow within the system is reversed from that of the vapor compression cycle, and the compressor 11 is replaced with a turbine 19 which, rather then being driven by a motor 16 is driven by the motive fluid in the system and in turn drives a generator 21 that produces power.

In operation, the evaporator which is commonly a boiler having a significant heat input, vaporizes the motive fluid, which is commonly water but may also be a refrigerant, with the vapor then passing to the turbine for providing motive power thereto. Upon leaving the turbine, the low pressure vapor passes to the condenser 18 where it is condensed by way of heat exchange relationship with a cooling medium. The condensed liquid is then circulated to the evaporator/boiler by a pump 22 as shown to complete the cycle.

Figure 3:
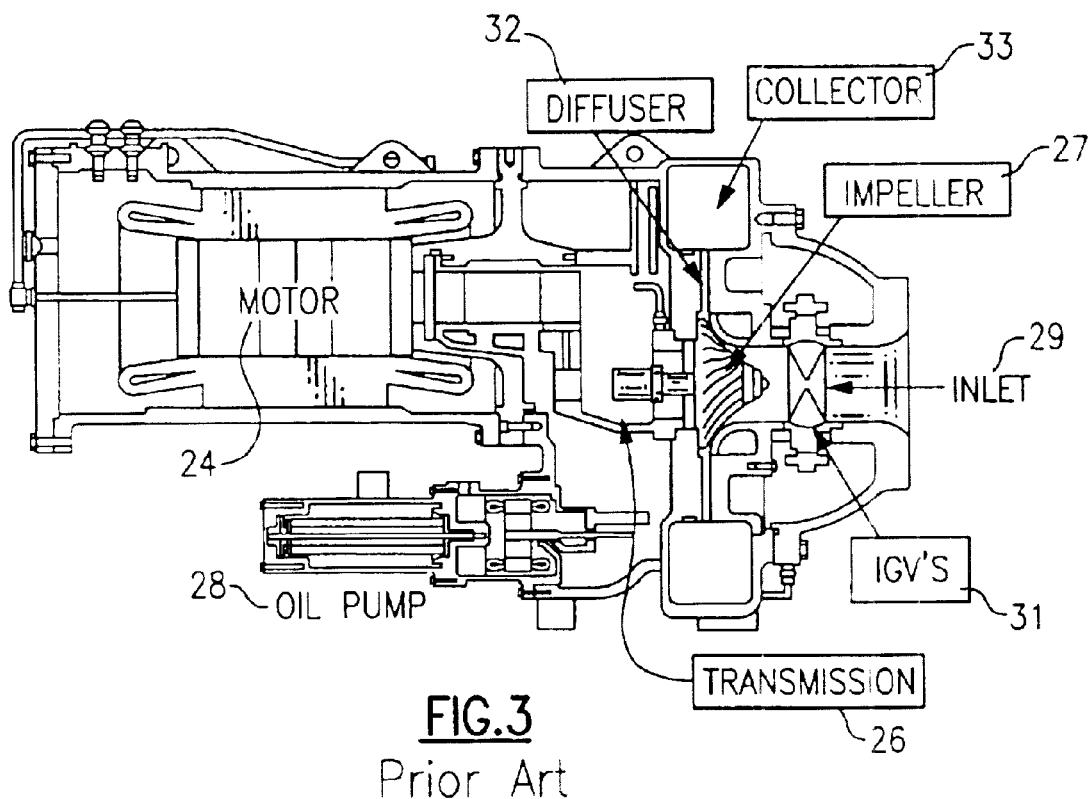
FIG. 3 is a sectional view of a centrifugal compressor in accordance with the prior art.

Referring now to FIG. 3, a typical centrifugal compressor is shown to include an electric drive motor 24 operatively connected to a transmission 26 for driving an impeller 27. An oil pump 28 provides for circulation of oil through the transmission 26. With the high speed rotation of the impeller 27, refrigerant is caused to flow into the inlet 29 through the inlet guide vanes 31, through the impeller 27, through the diffuser 32 and to the collector 33 where the discharge vapor is collected to flow to the condenser as described hereinabove.

Figure 4:
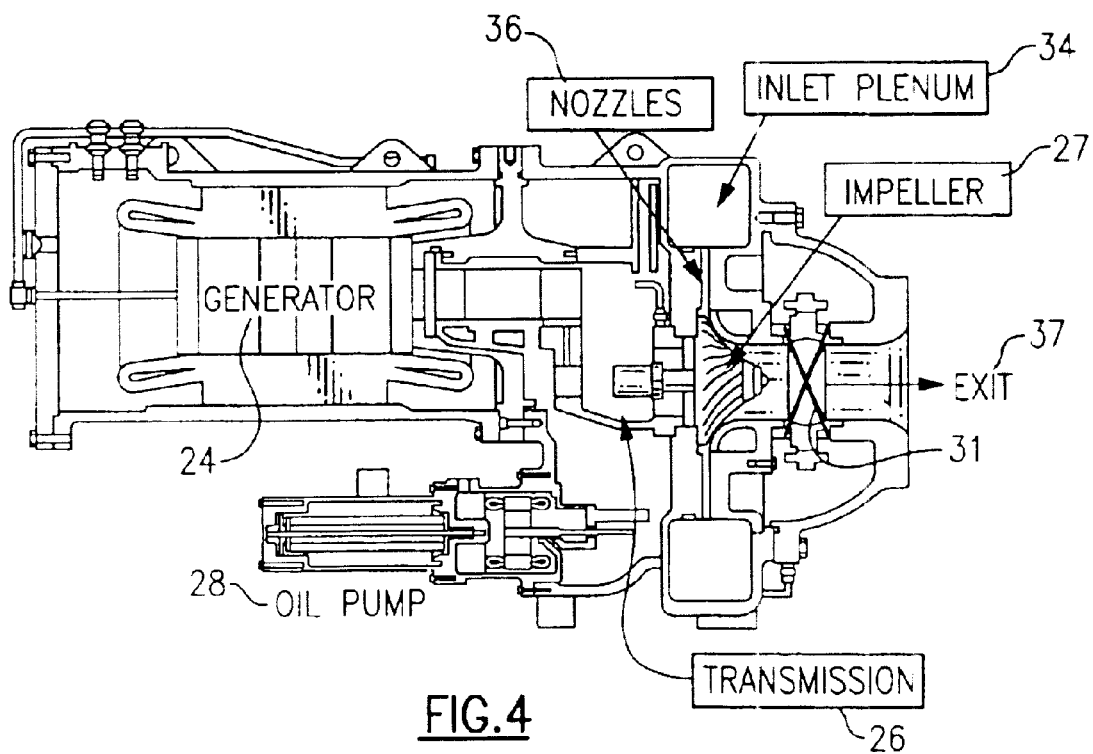
FIG. 4 is a sectional view of a compressor/turbine in accordance with a preferred embodiment of the invention.

In FIG. 4, the same apparatus shown in FIG. 3 is applied to operate as a radial inflow turbine rather then a centrifugal compressor. As such, the motive fluid is introduced into an inlet plenum 34 which had been designed as a collector 33. It then passes radially inwardly through the nozzles 36, which is the same structure which functions as a diffuser in the centrifugal compressor. The motive fluid then strikes the impeller 27 to thereby impart rotational movement thereof. The impeller then acts through the transmission 26 to drive a generator 24, which is the same structure which functioned as a motor in the case of the centrifugal compressor. After passing through the impeller 27 the low pressure gas passes through the inlet guide vanes 31 to an exit opening 37. In this mode of operation, the inlet guide vanes 31 are preferably moved to the fully opened position or alternatively, entirely removed from the apparatus.

Figure 5:
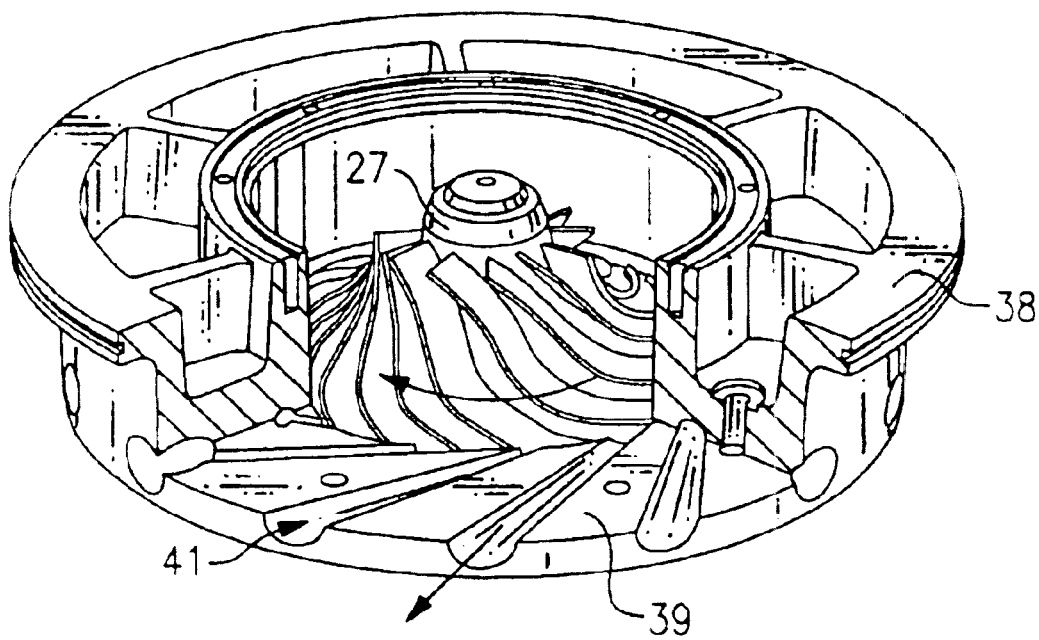
FIG. 5 is a perceptive view of a diffuser structure in accordance with the prior art.

In the centrifugal compressor application as discussed hereinabove the diffuser 32 can be any of the various types, including vaned or vaneless diffusers. One known type of vaned diffuser is known as a pipe diffuser as shown and described in U.S. Pat. No. 5,145,317, assigned to the assignee of the present invention. Such a diffuser is shown at 38 in FIG. 5 as circumferentially surrounding an impeller 27. Here, a backswept impeller 27 rotates in the clockwise direction as shown with the high pressure refrigerant flowing radially outwardly through the diffuser 38 as shown by the arrow. The diffuser 38 has a plurality of circumferentially spaced tapered sections or wedges 39 with tapered channels 41 therebetween. The compressed refrigerant then passes radially outwardly through the tapered channels 41 as shown.

Figure 6:
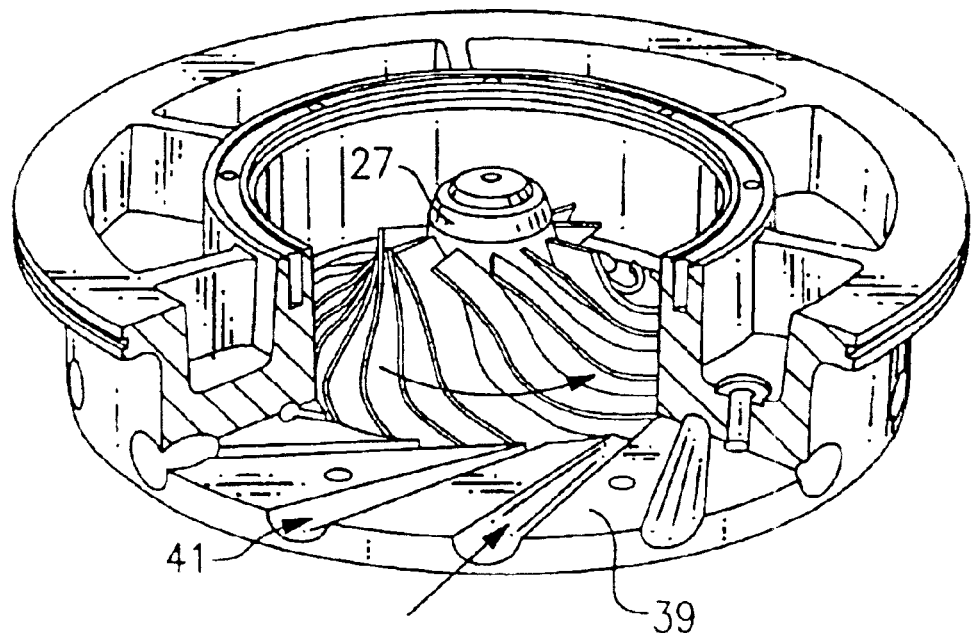
FIG. 6 is a schematic illustration of the nozzle structure in accordance with a preferred embodiment of the invention.

In the application wherein the centrifugal compressor is operated as a turbine as shown in FIG. 6, the impeller 27 rotates in a counterclockwise direction as shown, with the impeller 27 being driven by the motive fluid which flows radially inwardly through the tapered channels 41 as shown by the arrow.

Thus, the same structure which serves as a diffuser 38 in a centrifugal compressor is used as a nozzle, or collection of nozzles, in a turbine application. Further such a nozzle arrangement offers advantages over prior art nozzle arrangements. To consider the differences and advantages over the prior art nozzle arrangements, reference is made to FIGS. 7A and 7B hereof.

Figure 7A:
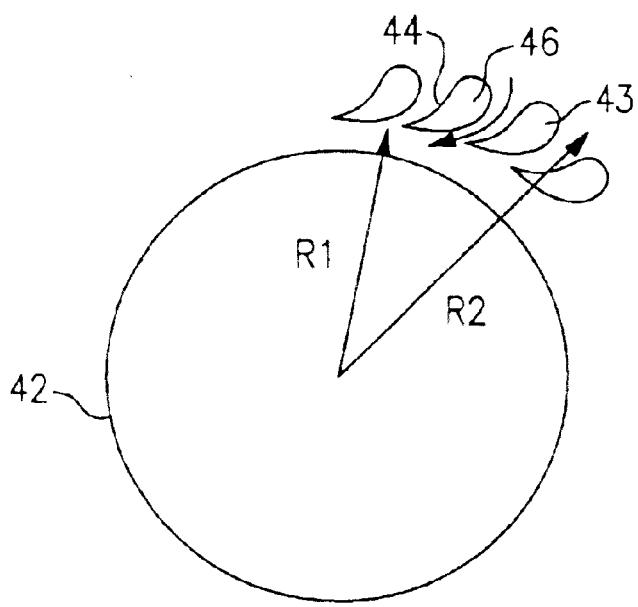
FIGS. 7A and 7B are schematic illustrations of $R_2/R_1$ (outside/inside) radius ratios for turbine nozzle arrangements for the prior art and for the present invention, respectively.

Referring now to FIG. 7A, a prior art nozzle arrangement is shown with respect to a centrally disposed impeller 42 which receives motive fluid from a plurality of circumferentially disposed nozzle elements 43. The radial extent of the nozzles 43 are defined by an inner radius $R_1$ and an outer radius $R_2$ as shown. It will be seen that the individual nozzle elements 43 are relatively short with quickly narrowing cross sectional areas from the outer radius $R_2$ to the inner radius $R_1$. Further, the nozzle elements are substantially curved both on their pressure surface 44 and their suction surface 46, thus causing a substantial turning of the gases flowing therethrough as shown by the arrow.

The advantage of the above described nozzle design is that the overall machine size is relatively small. Primarily for this reason, most, if not all, nozzle designs for turbine application are of this design. With this design, however, there are some disadvantages. For example, nozzle efficiency suffers from the nozzle turning losses and from exit flow non uniformities. These losses are recognized as being relatively small and generally well worth the gain that is obtained from the smaller size machine. Of course it will be recognized that this type of nozzle cannot be reversed so as to function as a diffuser with the reversal of the flow direction since the flow will separate as a result of the high turning rate and quick deceleration.

Figure 7B:
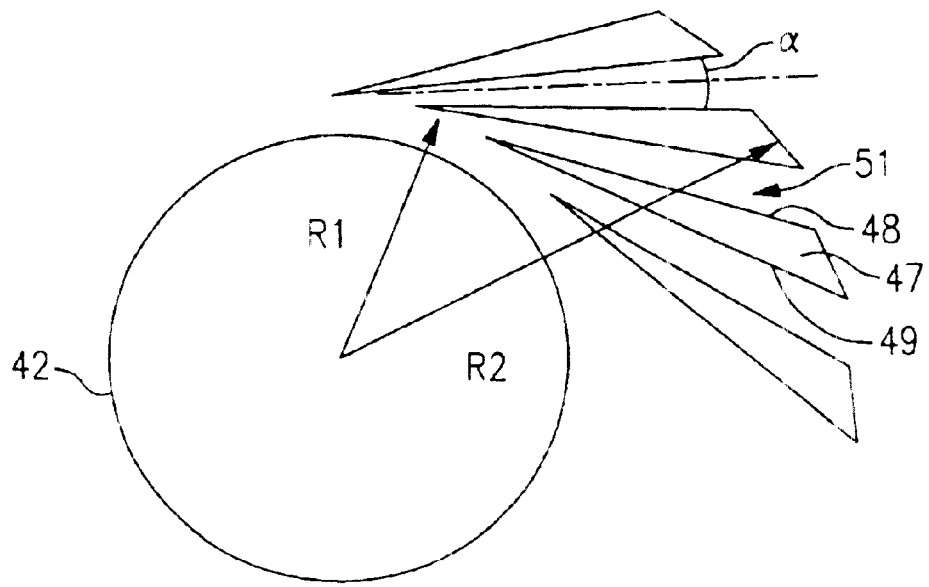

Referring now to FIG. 7B, the nozzle arrangement of the present invention is shown wherein the impeller 42 is circumferentially surrounded by a plurality of nozzle elements 47. It will be seen that the nozzle elements are generally long, narrow and straight. Both the pressure surface 48 and the suction surface 49 are linear to thereby provide relatively long and relatively slowly converging flow passage 51. They include a cone-angle $\propto$ within the boundaries of the passage 51 at preferably less then 9 degrees, and, as will been seen, the center line of these cones as shown by the dashed line, is straight. Because of the relatively long nozzle elements 47, the $R_2/R_1$ ratio is greater then 1.25 and preferably in the range of 1.4.

Because of the greater $R_2/R_1$ ratio, there is a modest increase in the overall machine size (i.e. in the range of 15%) over the conventional nozzle arrangement of FIG. 7A. Further, since the passages 51 are relatively long the friction losses are greater than those of the conventional nozzles of FIG. 7A. However there are also some performance advantages with this design. For example, since there are no turning losses or exit flow non-uniformities, the nozzle efficiency is substantially increased over the conventional nozzle arrangement even when considering the above mentioned friction losses. This efficiency improvement is in the range of 2%. Further, since this design is based on a diffuser design, it can be used in a reversed flow direction for applications as a diffuser such that the same hardware can be used for the dual purpose of both turbine and compressor as described above and as will be more fully described hereinafter.

Figure 8:
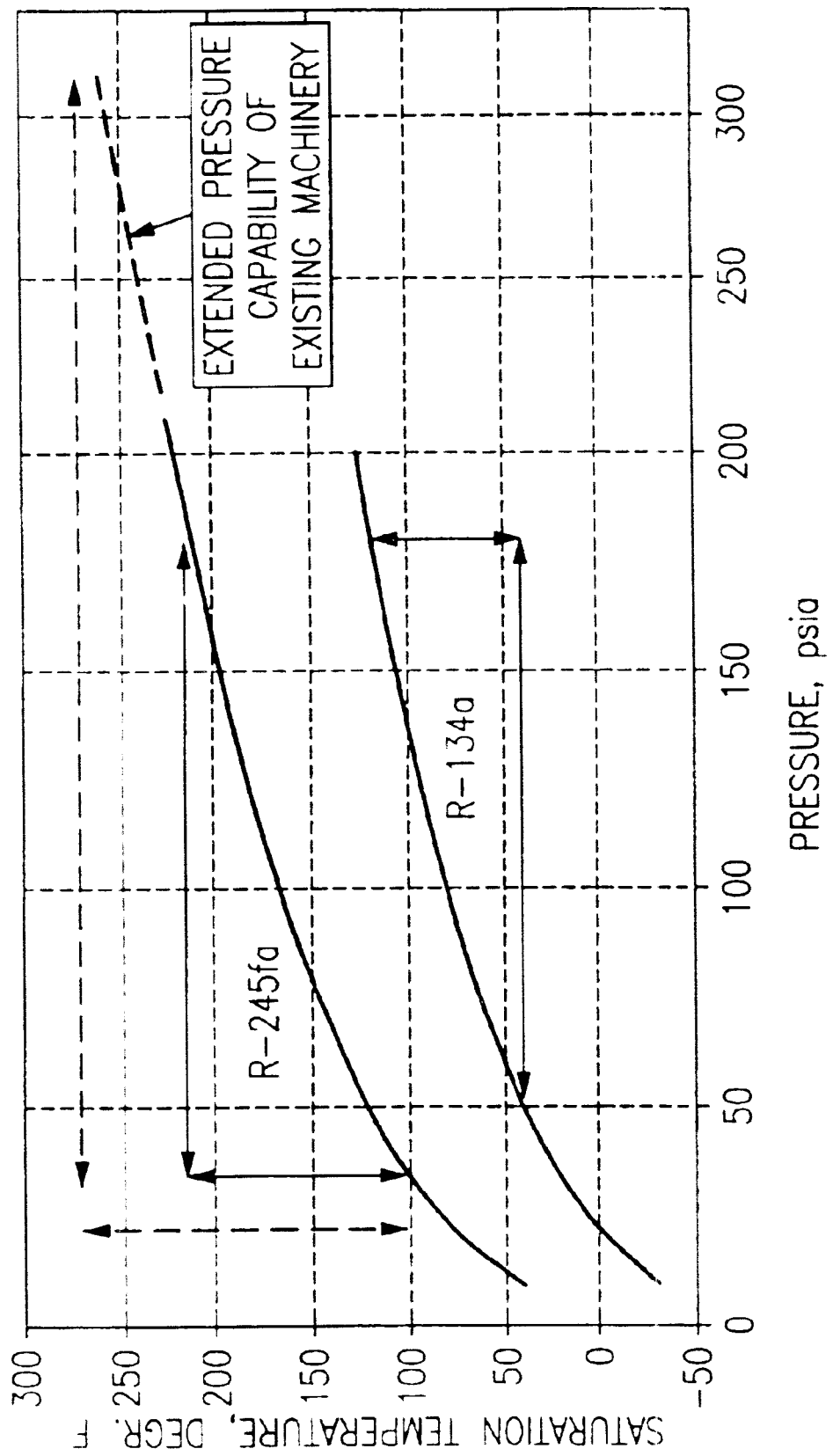
FIG. 8 is a graphical illustration of the temperature and pressure relationships of two motive fluids as used in the compressor/turbine in accordance with a preferred embodiment of the invention.

If the same apparatus is used for an organic rankine cycle turbine application as for a centrifugal compressor application, the applicants have recognized that a different refrigerant must be used. That is, if the known centrifugal compressor refrigerant R-134a is used in an organic rankine cycle turbine application, the pressure would become excessive. That is, in a centrifugal compressor using R-134a as a refrigerant, the pressure range will be between 50 and 180 psi, and if the same refrigerant is used in a turbine application as proposed in this invention, the pressure would rise to around 500 psi, which is above the maximum design pressure of the compressor. For this reason, it has been necessary for the applicants to find another refrigerant that can be used for purposes of turbine application. Applicants have therefore found that a refrigerant R-245fa, when applied to a turbine application, will operate in pressure ranges between 40–180 psi as shown in the graph of FIG. 8. This range is acceptable for use in hardware designed for centrifugal compressor applications. Further, the temperature range for such a turbine system using R-245fa is in the range of 100–200° F., which is acceptable for a hardware system designed for centrifugal compressor operation with temperatures in the range of 40–110° F. It will thus be seen in FIG. 8 that air conditioning equipment designed for R-134a can be used in organic rankine cycle power generation applications when using R-245fa. Further, it has been found that the same equipment can be safely and effectively used in higher temperatures and pressure ranges (e.g. 270° and 300 psia are shown by the dashed lines in FIG. 8), thanks to extra safety margins of the existing compressor.

Figure 9:
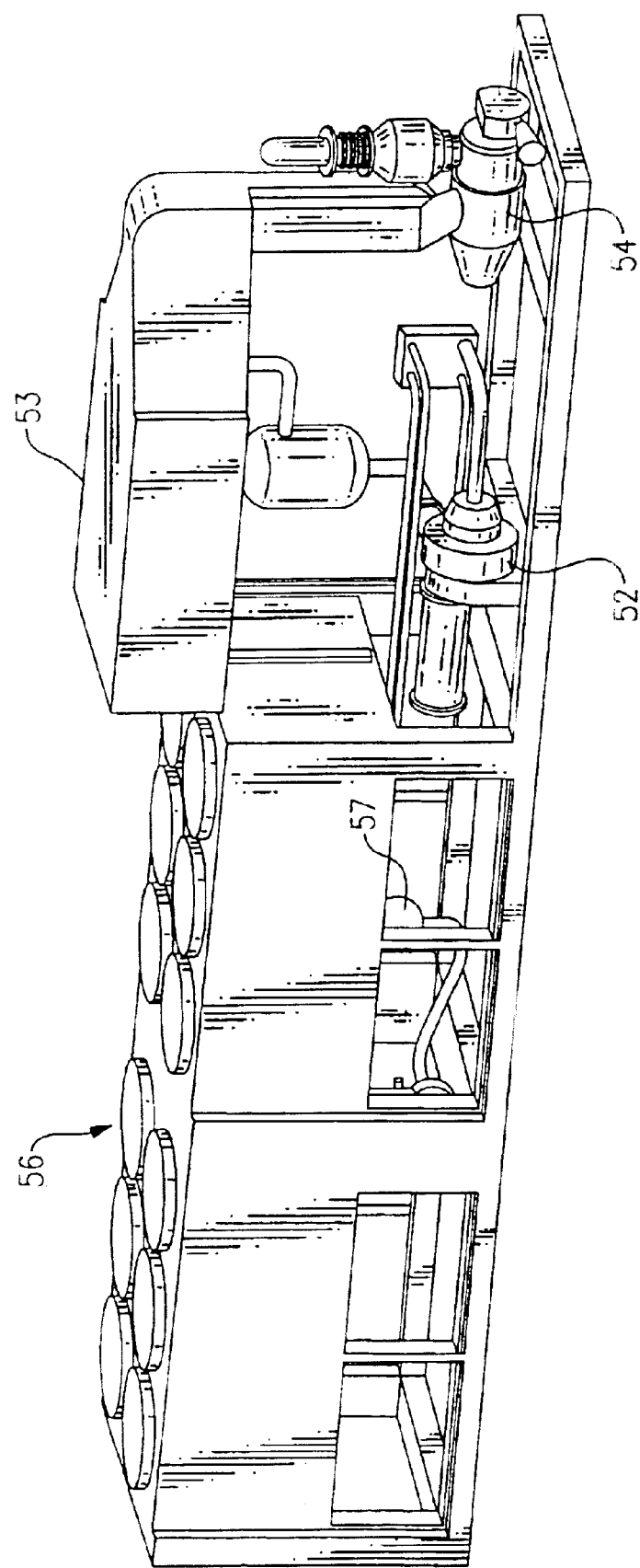
FIG. 9 is a perceptive view of a rankine cycle system with its various components in accordance with a preferred embodiment of the invention.

Having discussed the turbine portion of the present invention, we will now consider the related system components that would be used with the turbine. Referring to FIG. 9, the turbine which has been discussed hereinabove is shown at 52 as an ORC turbine/generator, which is commercially available as a Carrier 19XR2 centrifugal compressor which is operated in reverse as discussed hereinabove. The boiler or evaporator portion of the system is shown at 53 for providing relatively high pressure high temperature R-245fa refrigerant vapor to a turbine/generator 52. In accordance with one embodiment of the invention, the needs of such a boiler/evaporator may be provided by a commercially available vapor generator available from Carrier Limited Korea with the commercial name of 16JB.

The energy source for the boiler/evaporator 53 is shown at 54 and can be of any form of waste heat that may normally be lost to the atmosphere. For example, it may be a small gas turbine engine such as a Capstone C60, commonly: known as a microturbine, with the heat being derived from the exhaust gases of the microturbine. It may also be a larger gas turbine engine such as a Pratt & Whitney FT8 stationary gas turbine. Another practical source of waste heat is from internal combustion engines such as large reciprocating diesel engines that are used to drive large generators and in the process develop a great deal of heat that is given off by way of exhaust gases and coolant liquids that are circulated within a radiator and/or a lubrication system. Further, energy may be derived from the heat exchanger used in the turbocharger intercooler wherein the incoming compressed combustion air is cooled to obtain better efficiency and larger capacity.

Finally, heat energy for the boiler may be derived from geothermal sources or from landfill flare exhausts. In these cases, the burning gases are applied directly to the boiler to produce refrigerant vapor or applied indirectly by first using those resource gases to drive an engine which, in turn, gives off heat which can be used as described hereinabove.

After the refrigerant vapor is passed through the turbine 52, it passes to the condenser 56 for purposes of condensing the vapor back to a liquid which is then pumped by way of a pump 57 to the boiler/evaporator 53. Condenser 56 may be of any of the well known types. One type that is found to be suitable for this application is the commercially available air cooled condenser available from Carrier Corporation as model number 09DK094. A suitable pump 57 has been found to be the commercially available as the Sundyne P2CZS.

Figure 10:
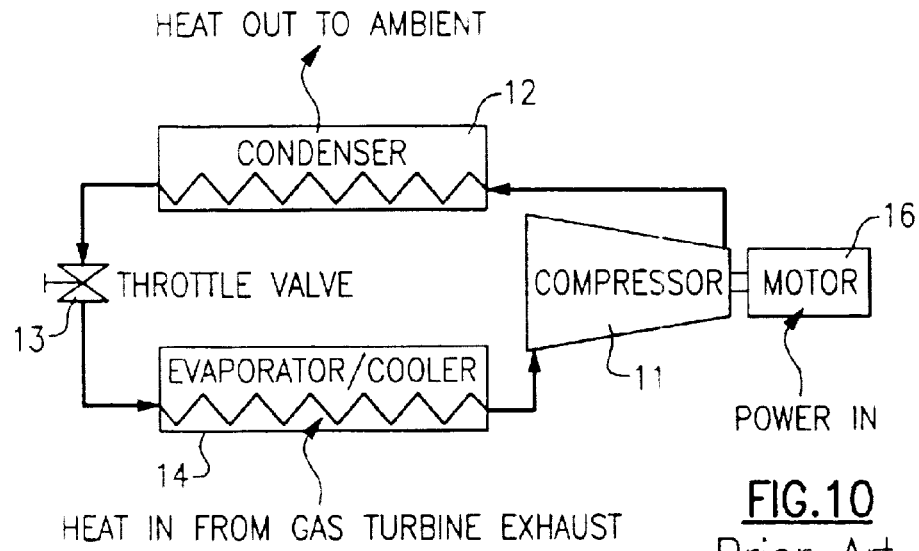
FIG. 10 is a schematic illustration of an air conditioning application in accordance with the prior art.

Referring now to FIG. 10, there is shown a prior art application of a centrifugal chiller as used for a cooling of the inlet air of a gas turbine engine for purposes of increasing the efficiency thereof. That is, the system operates in a conventional manner to circulate the refrigerant serially from the motor driven compressor 11 to the condenser 12 a throttle valve 13 and an evaporator cooler 14. Air being cooled, rather than being circulated to a building to be cooled, is passed to the inlet of a gas turbine engine to thereby twist the power output thereof. This occurs because of two reasons. First the efficiency of the thermodynamic cycle is increased by the lower inlet temperature of the inlet gas. Secondly, because the lower temperature of the inlet air increases its density, and since the gas turbine compressor is essentially accosted by a flow device, the mass flow rate through the compressor is increased. Inasmuch as the increase in power output resulting from the use of the air conditioner in this manner is greater than the power required to operate the air conditioner, such an application maybe economically feasible. It becomes more feasible when the system is used in combination with a rankine cycle system in accordance with the present invention. As will now be described in reference to FIG. 11.

Figure 11:
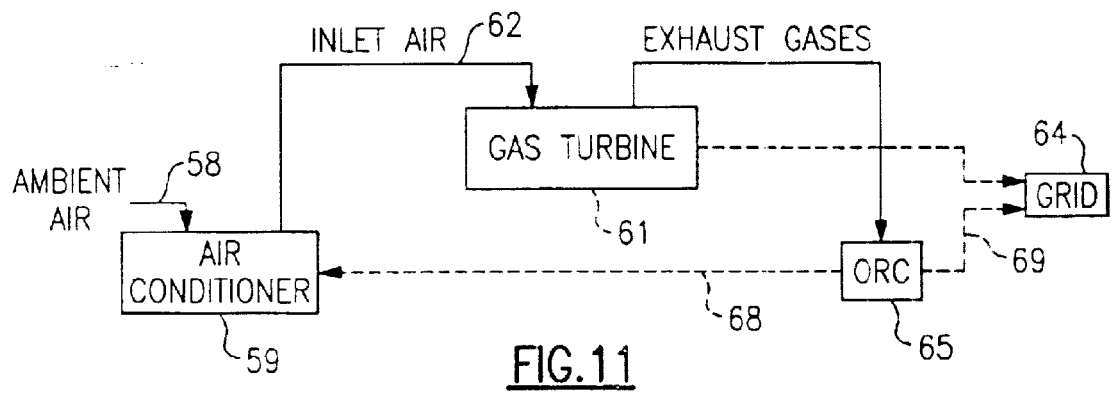
FIG. 11 is a schematic illustration of the rankine cycle/vapor compression system combination in accordance with the preferred embodiment of the invention.
Figure 12:
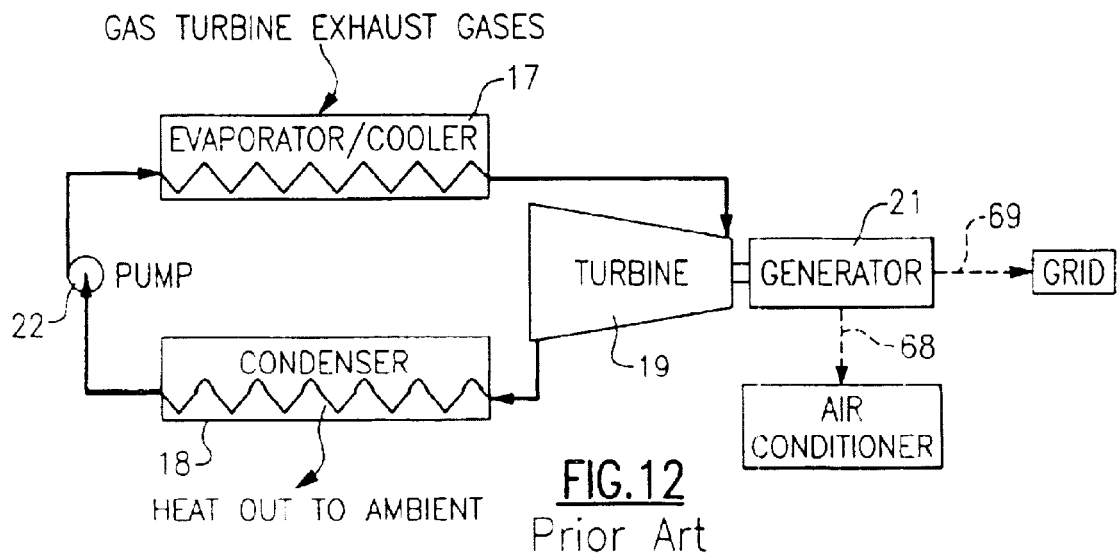
FIG. 12 is a schematic illustration of the rankine cycle system portion thereof.

Consistent with the system as described hereinabove, ambient air, indicated by an arrow 58 enters the air conditioner 59, with the cooled air then entering the gas turbine 61 as inlet air indicated by the arrow 62. The power that is generated by the gas turbine then passes along dotted line 63 to a grid 64. The exhaust gases from the gas turbine 61, which are normally at a temperature of around 700° F., are commonly discharged to the atmosphere. In accordance with the present invention, the exhaust gases pass along ling 66 to drive a turbine 19 of an organic rankine cycle system 64 as shown in FIGS. 11 and 12. The turbine 19, in turn, drives the generator 21, with power then passing to both the air conditioner 59 and to the grid 64 by dotted lines 68 and 69, respectively. The power that is generated by the ORC system 65 from the exhaust gas of the gas turbine 61 is estimated to be 4–6 times (depending on gas turbine exhaust temperature and mass flow rate) larger then that power required to operate the air conditioner 59 while performing gas turbine inlet cooling. Thus, the extra power can be passed by grid 64 along lines 69.

Figure 13:
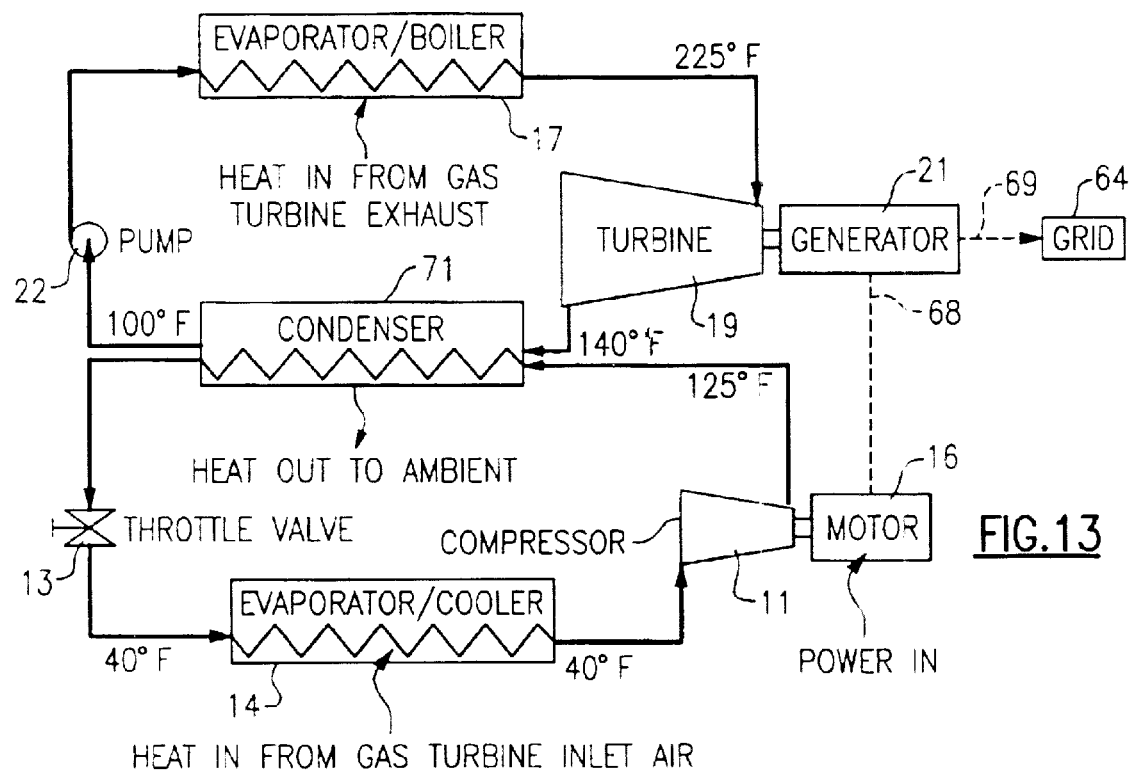
FIG. 13 is a schematic illustration of the combined system with a common condenser in accordance with the preferred embodiment of the invention.

Referring now to FIG. 13, there is shown a combination of the air conditioning system of FIG. 10 and the rankine cycle system of FIG. 12. However, rather then the individual condensers 12 and 18, respectively, single, common condenser 71 is provided to perform the condensing functions in each of the two systems. With such a combined system, it is of course, necessary to have the same medium passing from the compressor 11 and the turbine 19 to the condenser 71. The refrigerant R-245a has been found to be suitable for this purpose. Thus, the rankine cycle system described hereinabove, with the diffuser being used in reverse as a nozzle, and with R-245a as the refrigerant therefore to circulate the refrigerant through the system as indicated in FIG. 13 wherein refrigerant would be heated at the boiler by heat from the gas turbine exhaust to a temperature of 225° F. After passing through the turbine 19, the temperature of the refrigerant would be reduced to 140° F. prior to passing to the condenser 71, after which the temperature of the refrigerant would be at around 100° F. prior to being passed to the boiler to be heated.

The vapor compression cycle would be different from that described hereinabove wherein a high pressure system using R-134a as the refrigerant as described. Here, it would be necessary to use a relatively low pressure system with the R-245a refrigerant. A suitable vapor compression system for this purpose would be based on low pressure chiller designs using, for example R-11, R-123 or R-114. With such a vapor compression system, using R-245a, the temperatures of the refrigerant as it passes through the cycle would be as shown in FIG. 13. Thus, the condensed refrigerant from the condenser 71 would be around a 100° F., and after passing through the throttle valve 13 would be 40° F. and at a vapor/liquid mixture of about 85% liquid and 15% vapor. After passing through the evaporator 14, the refrigerant would still be 40° F. but would be entirely in the vaporous state to pass to the compressor 11. The temperature of the refrigerant passing to the condenser 71 would then be around 125° F.

In such a combined system, the condenser 71 would need to be slightly larger then the condenser 18 used in the rankine cycle system by itself as shown in FIG. 12. However, the disadvantage of the slight increase in size would be more then off set by the advantage, both in cost and space, that results from the elimination of the condenser 12 that would otherwise be needed for the vapor compression cycle.

Figure 14:
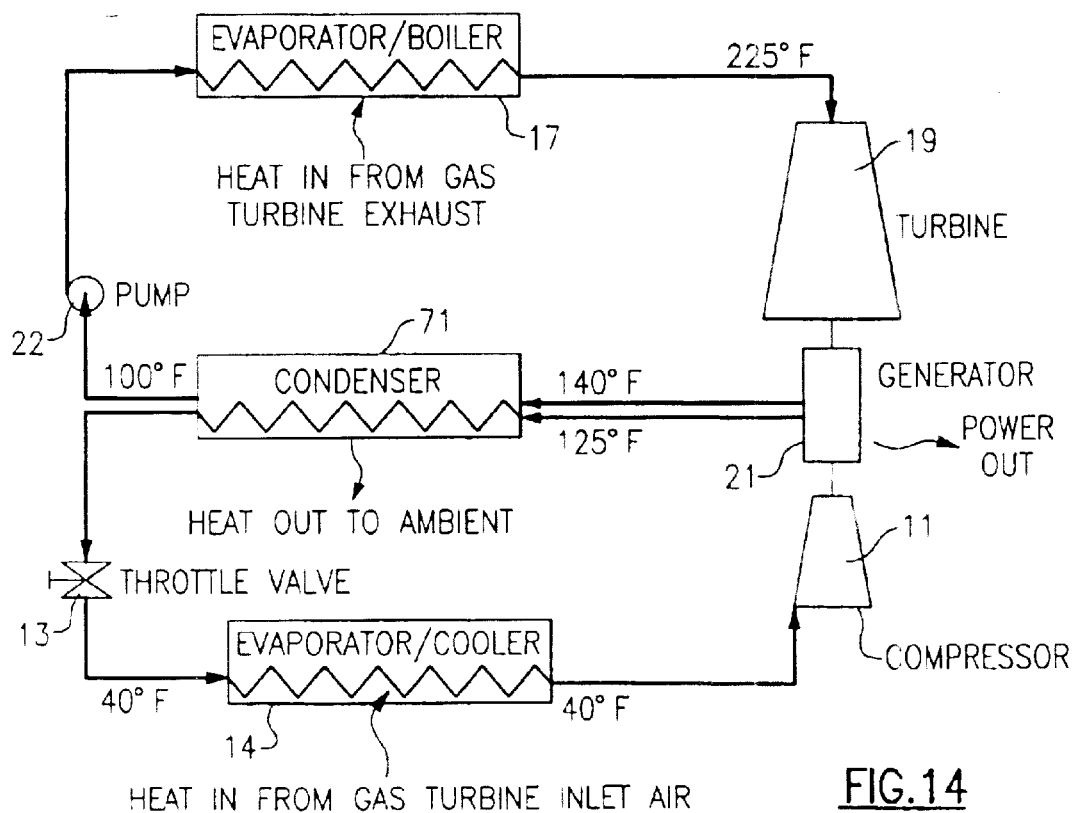
FIG. 14 is a schematic illustration of the combination with a common drive shaft in accordance with the preferred embodiment of the invention.

Having eliminated a condenser, a combined system can now be taken further to eliminate the drive motor 16 of the compressor 11 as shown in FIG. 14. Further, the turbine 19 drives the generator 21 by way of a shaft 72 with the shaft 72 then being a common shaft which extends through the other end of the generator 21 to drive the compressor 11. This maybe used between the turbine and the generator, or between the generator and the compressor. However, a direct drive arrangement is feasible if the components are properly selected. For example, a 400 $KW_{el}$ microturbine would produce 720 $KW_{th}$ of waste heat that, when captured by the organic rankine cycle of this invention, would produce an additional 80 $KW_{el}$ net. The amount of cooling required to cool the ambient air entering the 400 $KW_{el}$ microturbine is 20 tons of refrigeration (=70 $KW_{th}$) requiring a compressor with a 15 $KW_{el}$ motor. Specific speed considerations of the larger head/flow turbine and the smaller head/flow compressor allows operation of identical space on a common shaft.

While the present invention has been particularly shown and described with reference to preferred and alternate embodiments as illustrated in the drawings, it will be understood by one skilled in the art that various changes in detail may be effected therein without departing from the spirit and scope of the invention as defined by the claims.

We claim:

1. A combination of a rankine cycle turbine generator system and an air conditioner comprising:

a rankine cycle system including a boiler, a turbine for driving a generator, a condenser and a pump, wherein said boiler is heated from the exhaust gases of a gas turbine engine; and a vapor compression system including an evaporator, a motor driven compressor, a condenser and a throttle valve, wherein said evaporator is adapted to cool inlet air flowing to said gas turbine engine wherein said condenser in said rankine cycle system is common with the said condenser of said vapor compression system and further wherein a common refrigerant used in both the rankine cycle system and the vapor compression system is an organic refrigerant.

2. A combination of a rankine cycle turbine generator system and an air conditioner comprising:

a rankine cycle system including a boiler, a turbine for driving a generator, a condenser and a pump, wherein said boiler is heated from the exhaust gases of a gas turbine engine; and a vapor compression system including an evaporator, a motor driven compressor, a condenser and a throttle valve, wherein said evaporator is adapted to cool inlet air flowing to said gas turbine engine wherein said compressor drive motor receives its electrical power entirely from the turbine generator.

3. A combination of a rankine cycle turbine generator system and an air conditioner comprising:

a rankine cycle system including a boiler, a turbine for driving a generator, a condenser and a pump, wherein said boiler is heated from the exhaust gases of a gas turbine engine; and a vapor compression system including an evaporator, a motor driven compressor, a condenser and a throttle valve, wherein said evaporator is adapted to cool inlet air flowing to said gas turbine engine wherein said refrigerant is R-245a.

4. A combination of a rankine cycle turbine generator system and an air conditioner comprising:

a rankine cycle system including a boiler, a turbine for driving a generator, a condenser and a pump, wherein said boiler is heated from the exhaust eases of a gas turbine engine; and a vapor compression system including an evaporator, a motor driven compressor, a condenser and a throttle valve, wherein said evaporator is adapted to cool inlet air flowing to said gas turbine engine wherein the turbine generator and said compressor motor comprises a single element with a common shaft interconnecting said turbine to said compressor.

5. A combination as set forth in claim 1 wherein said air conditioning system is a chiller.

* * * * *